Figure 1:
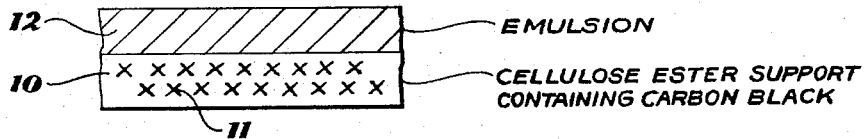

Sept. 5, 1967  W. F. HUNTER, JR., ETAL  3,340,062
PHOTOGRAPHIC ELEMENT

Filed Jan. 8, 1960  2 Sheets-Sheet 1

Walker F. Hunter, Jr.
Daniel F. Botkin
INVENTORS

ATTORNEYS

Sept. 5, 1967  W. F. HUNTER, JR., ET AL  3,340,062
PHOTOGRAPHIC ELEMENT
Filed Jan. 8, 1960  2 Sheets-Sheet 2
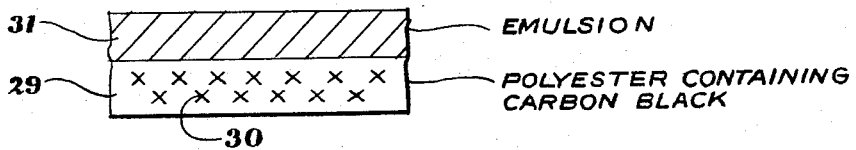
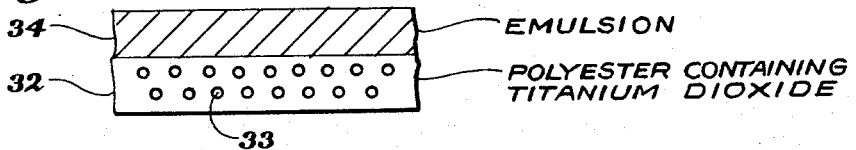
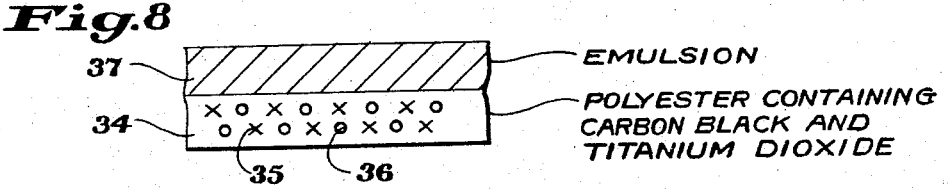
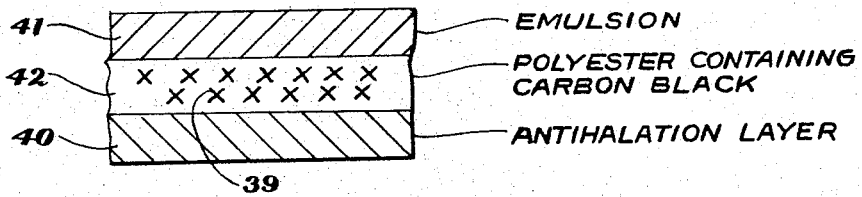
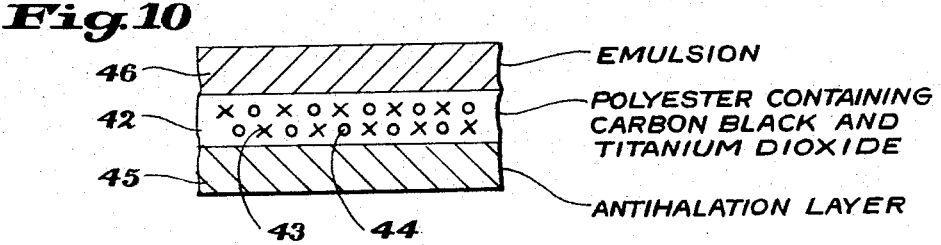
Walker F. Hunter, Jr.
Daniel F. Botkin
INVENTORS
R. Frank Smith
Walter O. Hodsdon
ATTORNEYS

United States Patent Office 3,340,062
Patented Sept. 5, 1967

3,340,062
PHOTOGRAPHIC ELEMENT
Walker F. Hunter, Jr., and Daniel F. Botkin, Rochester, N.Y., assignors to Eastman Kodak Company, Rochester, N.Y., a corporation of New Jersey
Filed Jan. 8, 1960, Ser. No. 1,385
12 Claims. (Cl. 96—84)

This invention relates to photography and more particularly to a photographic element comprising a light-sensitive emulsion associated with a pigmented film support which will reduce to a negligible amount, edge and lip fog in the photographic element. The pigment in the film support absorbs and/or refracts the major portion of the light entering the edges of the film support and thus prevents a disadvantageous quantity of light from reaching the image area of the photographic element.

In both roll film and film available in magazines, it is well known that fogging of the photographic emulsion in the image area may occur due to light passing through the edges of the film support. In magazine film such fogging, known as lip fog, occurs because of light reaching the edges of the film by way of the portion of the film positioned outside of the film magazine. In roll film, light may leak between the spool flanges and the film, paper or leader or strike the edges of rolls partially wound outside the flanges, thus exposing the edge of the film through the transparent film support to appreciable distances within the roll and hence, will expose the photographic emulsion adjacent thereto. This effect is known as edge fog in roll film.

Heretofore, various methods have been tried to obviate lip fog and edge fog. Many of them, while showing improvement in reducing fogging, have the disadvantage of changing the desired photographic or mechanical characteristics of the film.

Photographic films in rolls or magazines are slit or chopped during manufacture from wider or longer strips. In the cut edges a cross-section of the support is exposed. This edge protrudes from the lips of certain types of film magazines. Portions of this edge are often exposed to light while loading and unloading the rolls or magazines in cameras.

Light entering the exposed cut edge of the support is either propagated by transmission and internal reflection within the support parallel to the film surfaces, absorbed because of the optical density of the support, or refracted into the emulsion or other coatings applied to the surfaces of the support. Light propagated within the support is usually refracted from it in amounts sufficient to fog the adjacent areas of emulsion. Therefore, efficient propagation of light within the support causes extensive fogging of films in the picture area.

The extent of penetration of fog from the cut edge of the film depends upon the optical properties of the support and of the layers coated on the surfaces thereof. Samples of various types of cellulose ester film supports coated with a silver halide emulsion and antihalation layers are characterized by edge fog penetrations ranging from 0.3 inch to more than 2.5 inches from the cut edge when exposed through the edge under essentially identical conditions. Polyester resins, such as polyethylene terephthalate resin film support coated with a silver halide emulsion and antihalation layers, consistently produce a penetration of more than 2.5 inches under similar edge exposing conditions.

In normal daylight loading and unloading of cameras, propagation of light within the support from the cut edge which protrudes from the lips of film magazines can cause extensive lip fog in the image area of the photographic film contained in the magazine. Similar use of roll films often allows leakage of light through the gap between the edges of the laps of leader, backing paper, or film and the solid flanges of the spools. This light passes through the cut edge of the film support and may cause edge fogging of the image area of as many as 50% of the exposures made in the camera under high intensity illumination. This difficulty is particularly troublesome when careless loading and unloading of the camera or poor mechanical performance of certain cameras causes some of the cut edges of laps of film to be exposed to light outside the protective disks of the solid flanges of the spools.

Several methods have been devised to obviate unwanted fog in daylight loading films. Edge fog in roll film is reduced by mechanical prevention of leakage of light between the edges of laps of film and the solid flanges of the spools. One such mechanical means is the interwinding of the film with an opaque backing paper which extends beyond the ends of the film to provide a leader and trailer. If the backing paper is slightly wider than the inner flange separation of the spools, and the edges of the paper are thinned or skived as described in U.S. Patent No. 1,605,841 of Nov. 2, 1926, the gap between the edge of the film and the flange of the spool is closed by the edge of the backing paper in tightly wound rolls.

However, winding of a tight take-up roll requires appreciable back tension in the backing paper and film. Recent developments in camera design include film advance by rapid acting levers or plungers which provide low winding torque compared with the directly connected winding keys or knobs used in older cameras. These low winding torques have necessitated substantial reduction in the back tension provided in these cameras for the formation of tight take-up rolls. Therefore, backing paper wider than the inner flange separation of the spools is associated with an inordinately large number of unsatisfactory take-up rolls in such cameras.

Lip fog in magazine films has been controlled by the incorporation of dyes in the film support as described in U.S. Patent No. 2,622,026 of Dec. 16, 1952. The primary purpose of these dyes is the control of halation in the films. The optical density of such film supports is excessively high for use in edge fog control in roll films because of the concomitant undesirable increase in exposure time for printing, undesirable decrease in light available for projection, and unwanted changes in the sensitometric and photographic properties of film, particularly in the case of color films.

Dyes, such as those described above, are in solution in the film support and do not diffuse light propagated in the support. An unexpected feature of the present invention is the unpredicted efficiency of diffusing pigments in reducing edge fog penetration. When present in concentrations sufficient to increase the total diffuse density of the support by 0.04, these pigments were from 1.2 to 1.6 times as effective in controlling edge fog as the dyes described in U.S. 2,622,026.

An object, therefore, of the present invention is a photographic element which has improved characteristics as respects prevention of lip and edge fog.

Another object is to reduce substantially the penetration of lip fog and edge fog in photographic films without undesirably affecting the photographic or mechanical properties of the films, or the rolls, or magazines containing the films.

Another object of the present invention is a silver halide photographic film element including a film support which tends to diffuse light which causes edge fog or lip fog. This light, in accordance with this invention, may be absorbed in the film support or refracted from the film support.

Another object is a photographic film element including a film support which has a total diffuse density appreciably below its specular density.

A further object is a silver halide photographic film including a support which affords adequate protection of the picture areas of the film from lip fog and edge fog in rolls and magazines without the need of additional means for preventing light from striking the edges of the film.

Other objects will appear hereinafter.

In accordance with the present invention, these and other objects are attained by providing a light-sensitive protographic film having a film support containing finely-divided pigments which diffuse and may or may not substantially absorb light. The preferred pigments are finely-divided carbon black and titanium dioxide or their mixtures. This preferably results in a total, diffuse density appreciably below the specular density of the film support. In this novel pigmented film support, the light entering the edges of the support is either absorbed by the pigment or scattered so that it is absorbed near the edge by the adjacent light-sensitive photographic emulsion layer or other surface coatings. Accordingly, under normal camera loading conditions the light entering the edges of film support does not travel far enough into the support to expose the photographic emulsion in the image area. The effective length of path available in some films for this process is 20 to 30 times the support thickness.

The effectiveness of these pigments in reducing edge fog has been demonstrated by laboratory and practical tests. Films were prepared without pigment in the film support and with sufficient pigment in the support to increase the total diffuse density by 0.04 above the density of unpigmented support. Exposure to light of cut edges of these films caused edge fog penetration of 1.0 inch for unpigmented support, 0.4 inch for support containing carbon black and 0.2 inch for support containing titanium dioxide.

In practical tests of rolls of unpigmented film interwound with backing paper which were loaded, wound through, and unloaded from cameras and exposed to intense illumination, 50% of the possible exposure contained edge fog in some part of the image area. Only 10% of the exposures were fogged for films on film support containing sufficient carbon black to increase the density by 0.04 above that of unpigmented support.

The optimum particle size of titanium dioxide should be one half the light wavelength to which the film is sensitive. In microns, this will be 0.25 micron. However, satisfactory results can be obtained by employing particles in the range of from 0.2 to 0.35 micron. Larger particles or agglomerates of particles larger than 0.35 micron may detract from the image quality of photographic film.

The optimum particle size of the carbon black particles is 0.2 micron. This is a light absorptive pigment and it is important to have a sufficiently small particle size to prevent effect on image quality of the photographic film. Particle sizes of less than 0.2 microns are effective and desirable. Particle sizes above 0.2 micron may be detrimental to image quality under some conditions of use of photographic film.

The useful range and preferred values of concentration of these pigments in cellulose ester and polyethylene terephthalate film supports is shown in Table I. Clear film support has a standard density of 4.04.

TABLE I

| Support Type | Pigment | Concentration of Pigment in Percent of Weight of Support | | Increase in Support Density Above that of Unpigmented Support | | | |
|---|---|---|---|---|---|---|---|
| | | | | Average Total Diffuse Density | | Average Specular Density | |
| | | Useful Range (Percent) | Preferred Value (Percent) | Useful Range | Preferred Value | Useful Range | Preferred Value |
| Cellulose Ester (0.00325 in. thick) | Carbon black | 0.00785 to 0.0393 | 0.0157 | 0.02 to 0.10 | 0.04 | 0.03 to 0.16 | 0.06 |
| | Titanium dioxide | 0.0499 to 0.403 | 0.0805 | 0.01 to 0.10 | 0.02 | 0.03 to 0.50 | 0.07 |
| Polyethylene Terephthalate (0.004 in. thick) | Carbon black | 0.002 to 0.020 | 0.006 | 0.02 to 0.09 | 0.06 | 0.02 to 0.16 | 0.07 |
| | Titanium dioxide | 0.009 to 0.120 | 0.015 | 0.01 to 0.10 | 0.02 | 0.03 to 0.50 | 0.08 |

The values of total diffuse density quoted in the table were calculated from measurements of all of the light transmitted by the sample made with a recording spectrophotometer. The average density was calculated by integrating the density values over the range of wavelengths of light of 400 to 700 millimicrons. The average specular densities were measured in the same spectrophotometer by collecting light leaving the sample in a cone with an apex angle of 7.5° and with axis perpendicular to the plane of the sample.

*Example 1.—Preparation of dispersion of cellulose acetate-carbon black*

For use in cellulose esters a carefully dispersed carbon black pigment mixture was prepared by ball milling. First a solution as follows was prepared by mixing:

|  | Parts by wt. |
|---|---|
| Acetone | 39 |
| Methyl alcohol | 10 |
| Dimethoxyethyl phthalate | 27 |
| Cellulose acetate (39.5% acetyl) | 4 |

When this mixture had been completely dissolved, it was added to a ball mill with 20 parts by weight of carbon black and milled for 72 hours until a thorough dispersion of the carbon black was obtained.

A stock solution from which the final casting solution can be made was prepared by immediately mixing this carbon black dispersion with a cellulose ester solution of the following composition:

|  | Parts by wt. |
|---|---|
| Methylene chloride | 66.9 |
| Methyl alcohol | 3.9 |
| N-butyl alcohol | 7.9 |
| Triphenyl phosphate | 1.6 |
| Cellulose acetate propionate (30% acetyl, 14% propionyl) | 19.7 |

Seven parts of the carbon black dispersion are mixed with 3 parts of the cellulose ester solution to form the stock mixture. This is preferably done by adding this solution slowly to the pigment mixture with good agitation.

This stock mixture is then added, as described hereinafter to the desired cellulose ester compositions in the desired amount to obtain the desired density of the cast film support.

*Example 2.—Preparation of dispersion of cellulose acetate-titanium dioxide*

Titanium dioxide pigment solutions were prepared in exactly the same manner by replacing the carbon black with titanium dioxide.

*Example 3.—Preparation of pigment dispersions for polyester films*

Pigment dispersions for the use in polyester film were prepared by ball milling 10 parts by weight of carbon black or titanium dioxide in 90 parts by weight of ethylene glycol.

*Example 4.—Preparation of amateur cine film with carbon black pigment in support*

A high viscosity mixture of cellulose acetate propionate (30 percent acetyl, 14 percent propionyl) was prepared by mixing 16.2 parts by weight of this cellulose ester with 1.3 parts triphenyl phosphate, 70.2 parts methylene chloride, 4.0 parts methyl alcohol and 8.3 parts N-butyl alcohol. When this mixture had been dissolved and filtered, 0.059 gram of the stock of carbon black pigment mixture of Example 1 was thoroughly mixed with each pound of this solution.

This film casting solution was formed into film support by a film casting process to a thickness of 0.0052 inch. This film support had a total diffuse optical density of 0.04 above that of unpigmented support. This film support was surface treated in the usual manner to aid in the adhesion of certain silver gelatin emulsions and coated on one side with an antihalation layer by the procedure described in U.S. Patent 2,327,828 of Aug. 24, 1943. This film support was then emulsion coated with a color emulsion, slit and perforated for amateur cine film. This film is particularly advantageous for reducing the undesirable effects of edge fog which can result from exposure to light of the edges of the film, during loading and unloading of amateur movie cameras. The depth of penetration of edge fog in this film was 40% of that observed in similar film on unpigmented support.

*Example 5.—Preparation of amateur cine film with titanium dioxide pigment in support*

A similar photographic film was prepared with the formula as in Example 4 except that 0.305 gram of titanium dioxide pigment mixture was added to each pound of the solution. The total diffuse optical density of the support resulting from the addition of this pigment was 0.02 above that of unpigmented support. The depth of penetration of edge fog in this film was 30% of that observed in similar film on unpigmented support.

*Example 6.—Preparation of amateur cine film with carbon and titanium dioxide pigments*

A similar film was prepared with the formula as in Example 4 except that 0.4 gram of titanium dioxide mixture and 0.4 gram carbon pigment mixture were added to three pounds of the cellulose acetate propionate solution. The total diffuse optical density of the support resulting from the addition of these pigments was 0.045 above that of unpigmented support for a support thickness of 0.0052 inch. The depth of penetration of edge fog in this film was 30% of that in similar film on unpigmented support.

*Example 7.—Preparation of amateur roll film with carbon black pigment in support*

In the preparation of film support for amateur roll film, a high viscosity solution containing the following was prepared by thoroughly mixing:

| | Percent by wt. |
|---|---|
| Cellulose triacetate (43.5% acetyl) | 15.1 |
| Methyl alcohol | 4.2 |
| N-butyl alcohol | 8.3 |
| Methylene chloride | 70.1 |
| Triphenyl phosphate | 1.5 |
| Dimethoxyethyl phthalate | 0.8 |

To the above solution was added 0.089 gram of carbon black mixture per pound of solution. This solution was cast into film support with a thickness of 0.00325 inch. This film suport had a total diffuse optical density of 0.04 above normal. This film suport was surface treated, provided with antihalation, and emulsion coatings in a conventional manner and tested as amateur roll film. The presence of the carbon black in the film support decreased the undesirable effects of edge fog caused by light leakage between the edges of the film and backing paper and the spool flanges. The depth of penetration of edge fog in this film was 40% of that for similar unpigmented film.

*Example 8.—Preparation of amateur roll film with titanium dioxide in support*

A film support similar to that of Example 7 was prepared by using the titanium dioxide pigment mixture in the amount of 0.063 gram per pound of cellulose triacetate solution. This film support had a total diffuse optical density of 0.02 above that of unpigmented supports. It was coated with a light-sensitive emulsion to form a photographic film. When used as amateur roll film, the presence of titanium dioxide in the film support decreased the undesirable effects of edge fog caused by light leakage between the roll flanges and the edge of the film. The depth of penetration of edge fog in this film was 50% of that for similar unpigmented film.

*Example 9.—Preparation of roll film on polyester support containing titanium dioxide*

In the preparation of polyester film support containing pigment, the polyester, for example, polyethylene terephthalate, is made by reacting the desired methyl ester of a diacid with ethylene glycol. To this ethylene glycol was added, with mixing, some of the ethylene glycol containing titanium dioxide as described in Example 3. As a result of the mixing and reaction to obtain the polyester, the titanium dioxide was uniformly dispersed in the polyester. This polyester-titanium dioxide mixture was extruded as a melt through an extruding die to form a film support of 0.004 inch thickness. The resulting film had a total diffuse optical density of 0.02 above normal. Analysis of this film indicated that 0.015 percent of the support weight was titanium dioxide. This polyester film support was surface treated and provided with antihalation and silver halide emulsion coatings to produce roll photographic film.

Roll photographic film containing this titanium dioxide was tested with comparable roll photographic film having the same polyester film support, not containing titanium dioxide, by exposure of the edge of the film to a constant light source. The film containing the titanium dioxide showed less than 20% of the edge fog penetration associated with similar, unpigmented support.

*Example 10.—Preparation of roll film on polyester support containing carbon black*

In a manner shown in Example 9, a carbon black dispersion in ethylene glycol was added in the preparation of polyester. The film support formed from this material was analyzed. The total diffuse optical density of this support was 0.06 greater than that of unpigmented support and analysis showed the presence of 0.006 percent by weight of carbon black in the resin film support. This film was surface treated and provided with anti-halation and silver halide emulsion coatings. Edge fog penetration in this film was less than 10% of that in similar films on unpigmented support.

Figure 2:
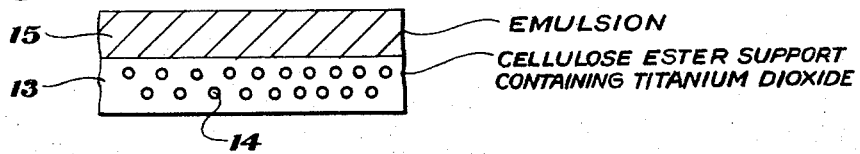
Figure 3:
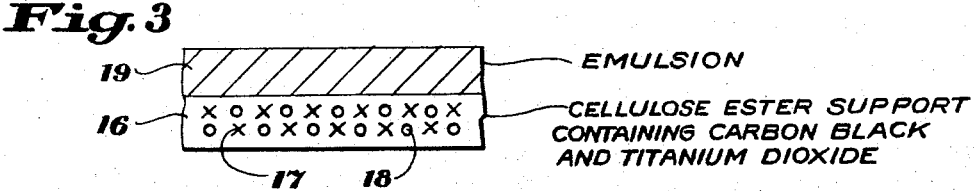
Figure 4:
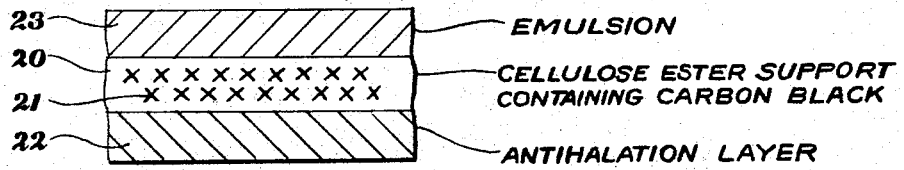

This invention will be further understood by reference to the following description and related drawings in which:

FIG. 1 represents a cross-section of a photographic film comprising a support 10 of a cellulose ester having uniformly dispersed therein finely-divided carbon black 11 in amounts sufficient to increase the total diffuse density in the range of from 0.02 to 0.09 above the density of the clear, unpigmented film support, and a silver halide emulsion layer 12 thereon;

FIG. 2 represents a cross-section of a photographic film comprising a support 13 of a cellulose ester having uniformly dispersed therein finely-divided titanium dioxide 14 in amounts sufficient to increase the total diffuse density as mentioned above and a silver halide emulsion layer 15 thereon;

FIG. 3 represents a cross-section of a photographic film comprising a support 16 of a cellulose ester having uniformly dispersed therein finely-divided carbon black 17 and titanium dioxide 18 to increase the diffuse density as described herein, and a silver halide emulsion layer 19 thereon;

FIG. 4 represents a cross-section of a photographic film comprising a support 20 having uniformly dispersed therein finely-divided carbon black 21 to increase the diffuse density, an antihalation layer 22 on one side of the film support and a silver halide emulsion layer 23 on the opposite side of the support.

Figure 5:
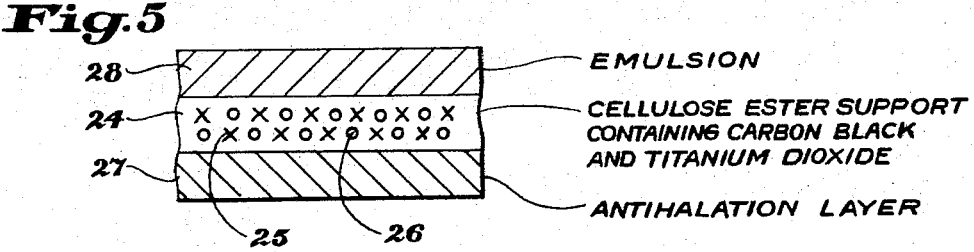

FIG. 5 represents a cross-section of a photographic film comprising a film support 24 of a cellulose ester having uniformly dispersed therein finely-divided carbon black 25 and titanium dioxide 26 in sufficient amounts to increase the total diffuse density, an antihalation layer 27 on one side and a silver halide emulsion 28 on the opposite side of the film support.

FIG. 6 represents a cross-section of a photographic film comprising a support 29 of a polyester having uniformly dispersed therein finely-divided carbon black 30 in amounts sufficient to increase the total diffuse density as described herein and a silver halide emulsion layer 31 thereon;

FIG. 7 represents a cross-section of a photographic film comprising a support 32 of a polyester having uniformly dispersed therein finely-divided titanium dioxide 33 in amounts sufficient to increase the total diffuse density as described herein, and a silver halide emulsion layer 34 thereon;

FIG. 8 represents a cross-section of a photographic film comprising a support 34 of a polyester having uniformly dispersed therein finely-divided carbon black 35 and titanium dioxide 36 in amounts sufficient to increase the total diffuse density as described herein, and a silver halide emulsion layer 37 thereover;

FIG. 9 represents a cross-section of a photographic film comprising a support 42 of a polyester having uniformly dispersed therein finely-divided carbon black 39 to increase the total diffuse density, an antihalation layer 40 on one side and silver halide emulsion layer 41 on the opposite side of the support.

FIG. 10 represents a cross-section of a photographic film comprising a support 42 of polyester having uniformly dispersed therein finely-divided carbon black 43 and titanium dioxide 44, an antihalation layer 45 on one side of the support and a silver halide emulsion layer 46 on the opposite side of the support.

Instead of a single photographic silver halide emulsion, the selected support can be coated with a plurality of emulsions, for example, as shown in U.S. Patents 2,350,764, 2,360,214, 2,376,202, 2,391,198 and 2,403,721. The photographic emulsion preferably employed may be those described in the above-mentioned patents which are the usual gelatino-silver halide emulsions customarily used in black-and-white or multicolor reproduction. These emulsions can also consist of silver halide dispersed in other water-permeable colloidal materials, such as synthetic resins, e.g. polyvinyl alcohol and hydrolyzed polyvinyl acetate, cellulose ethers and esters. Typical silver halide emulsions include silver chloride, bromide, bromiodide, and chlorobromide types. The photographic silver halide emulsions can contain the usual addenda such as polymethine sensitizing dyes and anti-foggants.

The photographic film support may be cellulose acetate containing from 42.5 to 44.0 percent acetyl. Such cellulose triacetate esters are described in U.S. Patents 2,492,977, 2,492,978 and 2,739,069. However, a mixed cellulose ester, such as the cellulose acetate propionate described in U.S. Patent 2,739,070 may be used. The dispersed pigments, when used according to our invention, have no adverse effect on the physical properties of the support.

The film support may be formed by well-known casting processes wherein a film support solution is coated onto a revolving surface on which the solvent is evaporated therefrom. The solid component of the film support, such as for example, cellulose acetate, is dissolved in a suitable solvent such as a mixture of methylene chloride and methanol and the required amount of pigment homogeneously incorporated therein. A suitable casting process is that disclosed in Kenyon Patent 2,878,521 of Mar. 24, 1959.

The polyester resin photographic film support may be the polyethylene terephthalate which is described in U.S. Patents 2,627,088 and 2,779,684.

We claim:
1. A photographic film comprising in combination at least one photographic silver halide emulsion layer and a transparent film support therefor containing uniformly dispersed finely-divided carbon black in amounts sufficient to increase the total diffuse density of the support to within a range of from 0.02 to 0.10.

2. A photographic film comprising in combination at least one photographic silver halide emulsion layer on one side of a transparent film support therefor containing uniformly dispersed, finely-divided carbon black in amounts sufficient to increase the total diffuse density of the support to within a range of 0.01 to 0.10 and an antihalation layer on the opposite side of the film support.

3. A photographic film comprising in combination at least one photographic silver halide emulsion layer and a transparent cellulose acetate film support therefor containing uniformly dispersed, finely-divided carbon black in amounts sufficient to increase the total diffused density of the support to within a range of from 0.02 to 0.10.

4. A photographic film comprising in combination at least one photographic silver halide emulsion layer on one side of a transparent cellulose acetate film support therefor containing uniformly dispersed, finely-divided carbon black in amounts sufficient to increase the total diffuse density of the support to within a range of 0.01 to 0.10 and an antihalation layer on the opposite side of the film support.

5. A photographic film comprising in combination at least one photographic silver halide emulsion layer and a transparent polyethylene terephthalate film support therefor containing uniformly dispersed, finely-divided carbon black in amounts sufficient to increase the total diffuse density of the support over a range of from 0.02 to 0.10.

6. A photographic film comprising in combination at least one photographic silver halide emulsion layer and a transparent polyethylene terephthalate film support therefor containing uniformly dispersed, finely-divided titanium dioxide in amounts sufficient to increase the total diffuse density of the support over a range of from 0.01 to 0.10.

7. A photographic film comprising in combination at least one photographic silver halide emulsion layer and a transparent polyethylene terephthalate film support therefor containing finely-divided and uniformly dispersed carbon black and titanium dioxide in amounts sufficient to increase the total diffused density of the support over a range of 0.01 to 0.10.

8. A photographic film comprising in combination at least one photographic silver halide emulsion layer on one side of a transparent polyethylene terephthalate film support therefor containing uniformly dispersed, finely-divided carbon black in amounts sufficient to increase the total diffuse density of the support over a range of 0.01 to 0.10 and an antihalation layer on the opposite side of the film support.

9. A photographic film comprising in combination at least one photographic silver halide emulsion layer on one side of a transparent polyethylene terephthalate film support therefor containing uniformly dispersed, finely-divided carbon black and titanium dioxide in amounts sufficient to increase the total diffuse density of the support over a range of 0.01 to 0.10 and an antihalation layer on the opposite side of the film support.

10. A photographic film comprising at least one photographic silver halide emulsion layer and a transparent cellulose acetate support therefor containing uniformly dispersed titanium dioxide in amounts sufficient to increase the total diffuse density of the support by from 0.01 to 0.10 and with a specular density 3 to 5 times the total diffuse density.

11. A photographic film comprising (a) a clear, transparent polyethylene terephthalate film base, said base containing uniformly dispersed finely divided particles of carbon black in an amount sufficient to increase the total diffuse density of the support from 0.01 to 0.10, and (b) at least one light-sensitive silver halide layer supported by the base.

12. A photographic film comprising (a) a clear, transparent polyethylene terephthalate film base, said base containing uniformly dispersed finely divided particles of carbon black in an amount sufficient to increase the total diffuse density of the support from 0.01 to 0.07 and (b) at least one light1sensitive silver halide layer supported by the base.

References Cited

UNITED STATES PATENTS

| | | | |
|---|---|---|---|
| 1,817,963 | 8/1931 | Capstaff | 96—84 |
| 1,908,527 | 5/1933 | McMaster | 96—84 |
| 1,929,254 | 10/1933 | Narath | 96—84 |
| 2,086,997 | 7/1937 | de Stubner | 106—193 |
| 2,205,722 | 6/1940 | Graves | 106—142 |
| 2,627,088 | 2/1953 | Alles et al. | 96—84 X |
| 2,755,186 | 7/1956 | Saner | 96—84 |
| 2,773,769 | 12/1956 | Goldschein | 96—87 X |
| 2,819,173 | 1/1958 | Dithmar | 260—40 |

FOREIGN PATENTS

| | | |
|---|---|---|
| 555,912 | 4/1958 | Canada. |
| 536,740 | 5/1941 | Great Britain. |

NORMAN G. TORCHIN, *Primary Examiner.*

PHILIP E. MANGAN, H. N. BURNSTEIN,
*Examiners.*

J. L. SPROULL, R. L. STONE, W. C. GILLIS, A. D. RICCI, *Assistant Examiners.*